United States Patent
Elgamal (10) Patent No.: US 10,189,634 B2
(45) Date of Patent: Jan. 29, 2019

(54) METHOD AND APPARATUS FOR ASSEMBLING AND PACKAGING CUPCAKE BOUQUETS FOR TRANSPORT

(71) Applicant: Orange Alligator, Verona, NJ (US)

(72) Inventor: Wissam Elgamal, Monroe, NJ (US)

(73) Assignee: Orange Alligator DBA Baked Bouquet, Verona, NJ (US)

( * ) Notice: Subject to any disclaimer, the term of this patent is extended or adjusted under 35 U.S.C. 154(b) by 405 days.

(21) Appl. No.: 15/054,931

(22) Filed: Feb. 26, 2016

(65) Prior Publication Data

US 2016/0251144 A1    Sep. 1, 2016

Related U.S. Application Data (60) Provisional application No. 62/126,042, filed on Feb. 27, 2015.

(51) Int. Cl.
| | | |
|---|---|---|
| *B65D 25/06* | (2006.01) | |
| *B65D 85/36* | (2006.01) | |
| *B65D 5/64* | (2006.01) | |
| *B65D 5/68* | (2006.01) | |
| *B65D 67/00* | (2006.01) | |
| *B65D 5/50* | (2006.01) | |
| *A47F 7/00* | (2006.01) | |
| *A47J 47/14* | (2006.01) | |

(52) U.S. Cl.
CPC .......... *B65D 85/36* (2013.01); *B65D 5/5035* (2013.01); *B65D 5/64* (2013.01); *B65D 5/68* (2013.01); *B65D 67/00* (2013.01); *A47F 7/0071* (2013.01); *A47J 47/14* (2013.01); *B65D 2585/363* (2013.01)

(58) Field of Classification Search
CPC .......... B65D 5/5035; B65D 5/64; B65D 5/68; B65D 85/36; B65D 2585/363; A21C 15/00; A21C 15/007; A47F 7/0071; A47J 47/10; A47J 47/14
USPC ................ 426/273, 389, 392, 410; 206/457; 211/85.4; 220/475
See application file for complete search history.

(56) References Cited

U.S. PATENT DOCUMENTS

| | | | | |
|---|---|---|---|---|
| 4,844,243 A | * | 7/1989 | Stiles ........................ | A47F 3/14 206/457 |
| 5,413,801 A | * | 5/1995 | McIlwain ................ | A23G 3/50 211/126.2 |
| D403,558 S | * | 1/1999 | Martinez ........................ | D7/610 |
| 6,450,341 B1 | * | 9/2002 | Krupa .................. | B65D 5/5038 206/497 |
| 8,708,166 B1 | * | 4/2014 | Crouch .................... | A01G 5/04 211/181.1 |
| 2005/0279747 A1 | * | 12/2005 | Madagan ................ | A21B 3/132 220/475 |
| 2014/0091087 A1 | * | 4/2014 | Vollano .................. | A47J 47/14 220/4.27 |

(Continued)

*Primary Examiner* — Luan K Bui
(74) *Attorney, Agent, or Firm* — Moser Taboada (57) ABSTRACT

The present invention relates to a cupcake holder for secure transport. In one embodiment, the cupcake holder comprises a vase, a mount for mounting a plurality of cupcakes, attached to the vase, a plurality of support pins attached to the mount, projections of pairs of the support pins of configured to support a cupcake; and at least one skewer corresponding to each of the plurality of cupcakes, inserted through each of the cupcake into the mount.

1 Claim, 5 Drawing Sheets

(56) References Cited

U.S. PATENT DOCUMENTS

2016/0192789 A1* 7/2016 Liao ................ A47F 5/0018
                                                   211/85.4
2017/0086608 A1* 3/2017 Butler ............... A47G 19/00
2018/0020682 A1* 1/2018 Bullard ............. A21C 15/00
                                                    426/273

* cited by examiner

METHOD AND APPARATUS FOR ASSEMBLING AND PACKAGING CUPCAKE BOUQUETS FOR TRANSPORT

CROSS-REFERENCE TO RELATED APPLICATION

This application claims benefit of U.S. Provisional Patent Application No. 62/126,042 filed Feb. 27, 2015, which is hereby incorporated in its entirety.

BACKGROUND

Field of the Invention

Embodiments of the present invention generally relate to food packaging and transport and, more particularly, to a method and apparatus for assembling and packaging cupcake bouquets for transport.

Description of the Related Art

Baked goods, such as cupcakes, are widely served at a variety of festivities and occasions. Presentation is particularly important, and hosts seek to impress their guests with unique designs and patterns of cupcakes. One such unique presentation involves arranging cupcakes as a bouquet, creating a cupcake bouquet with a vase. However, it is a challenge to position cupcakes in the bouquet without either compromising the presentation or the integrity of the arrangement, leading to possible breakage. Additionally, it is a challenge to package the cupcake bouquet for easy display and removal by the customer without damaging the bouquet. Furthermore, it is another challenge to transport the cupcake bouquet package while avoiding damage to the bouquet and the cupcakes due to vehicle movement, vehicle breaking, and the like.

Therefore, there is a need in the art for a method and apparatus for assembling and packaging cupcake bouquets for transport.

SUMMARY

A cupcake holder in the form of a bouquet, and techniques for making and packaging the cupcake bouquet are described herein. The cupcakes are arranged over a hemispherical base, and are supported vertically and horizontally over the hemispherical base. The cupcake bouquet is enclosed in a box, and the movement of the cupcake bouquet within the box is restricted.

These and other features and advantages of the present disclosure may be appreciated from a review of the following detailed description of the present disclosure, along with the accompanying figures in which like reference numerals refer to like parts throughout.

While the method and apparatus for assembling and packaging cupcake bouquets for transport is described herein by way of example for cupcakes, those skilled in the art will recognize that the method and apparatus for assembling and packaging cupcake bouquets for transport is not limited to the embodiments or drawings described. It should be understood, that the drawings and detailed description thereto are not intended to limit embodiments to the particular form disclosed. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Embodiments of the present invention generally relate to a method and apparatus for assembling and transporting cupcake bouquets for transport. The cupcakes are arranged in the form of a flower bouquet, having a vase forming the base of the bouquet, and a cupcake mount attached to the vase, for securing the cupcakes in the form of a bouquet. The mount includes support pins or a supporting disc to support the cupcakes arranged removably over the mount, such that the cupcakes stay stably positioned over the mount and the cupcakes may be removed as desired by a consumer of the cupcake bouquet without impacting other cupcakes in the arrangement. Skewers are inserted into the foam from the top of the foam to secure the cupcake. The cupcake bouquet is secured in a packaging box via two or more crossed skewers that are approximately the same length and width of the box. The vase of the cupcake bouquet is secured to the base of the box, and support pins passing through the mount restrict the movement of the cupcake bouquet in the box during transport. In some embodiments, the vase of the cupcake bouquet is affixed to a base plate, which restricts the movement of the cupcake bouquet in the box during transport.

Various embodiments of a method and apparatus for assembly and packaging of cupcake bouquets are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Figure 1:
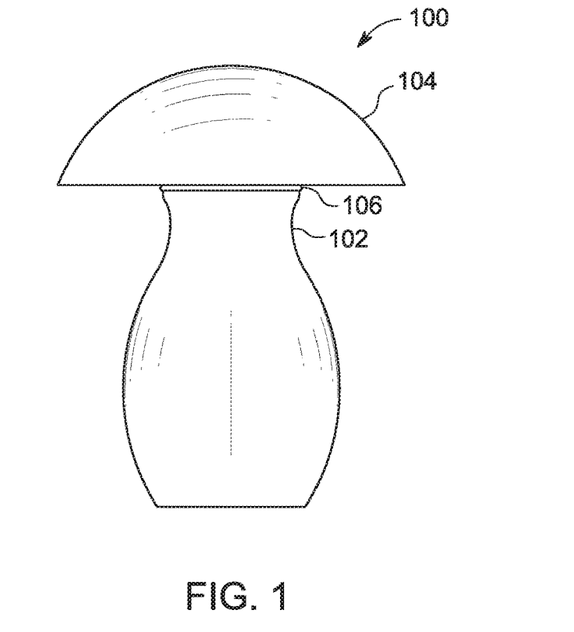
FIG. 1 is a front view of a cupcake bouquet being assembled, according to one or more embodiments of the present invention.

FIG. 1 is a frontal view of a cupcake bouquet 100 being assembled, according to one or more embodiments. The bouquet 100 includes a vase 102, a mount 104 attached to the vase 102 using an adhesive 106. The vase 102 forms the base of the bouquet 100, and according to some embodiments, the vase 102 includes a glass vase, a plastic vase, a metal vase, among others. The mount 104 is generally a portion of a sphere, such as a hemisphere, to support cupcakes in a bouquet formation. The mount 104 may be made using a firm material capable of supporting the weight of the cupcakes, and to accommodate pins and skewers used for supporting cupcakes. According to some embodiments, the mount 104 is made using polystyrene foam, e.g., closed-cell extruded foam such as STYROFOAM, in a hemispherical shape. The adhesive 106 is any adhesive suitable for attaching the mount 104 to the vase 102. According to some embodiments, the adhesive 106 is a thermoplastic adhesive such as hot melt adhesive applicable using a hot glue gun, an epoxy adhesive, and several other suitable adhesives as known in the art. In some embodiments, the mount 104 may partially overlap a top portion of the vase 102 to further ensure that the mount 104 is limited in movement. For example, the mount 104 may be shaped to have a portion fit snugly within an opening of the vase 102, for example the mouth (not shown) of the vase 102.

Figure 2:
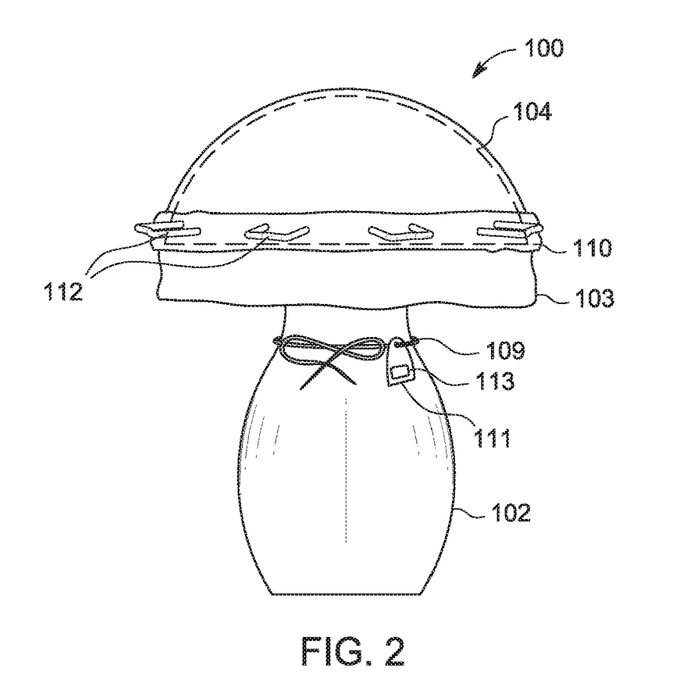
FIG. 2 is a front view of the cupcake bouquet of FIG. 1 being assembled further, according to one or more embodiments.

FIG. 2 is another frontal view of a cupcake bouquet 100 of FIG. 1 being assembled further, according to one or more embodiments. The bouquet 100 includes support pins 112 to provide support for cupcakes. The support pins 112 include for example, greenery pins (also called greening pins), U-shaped pins, and the like, and are inserted into the mount 104. A portion of the support pins 112 projects outwards from the surface of the mount 104 to provide vertical support for cupcakes. Once inserted, the support pins 112 are not easily dislodged from the mount 104. The portion of support pins 112 projecting from the mount 104 serve as a base to provide vertical support for a cupcake.

According to some embodiments, the bouquet 100 also includes a decorative colored sheet 108 covering the mount 104, and a ribbon 110 for skirting the lower edge of the mount 104. The colored sheet 108 may be made from paper, or plastics, such as cellophane, and the like and serve to mask the mount 104 with an aesthetically suitable color for the bouquet 100 appearance. Similarly, the ribbon 110 is an aesthetically suitable color and material, and may be crafted with different patterns, for example, patterns resembling plants and greens, or other desirable patterns. In one embodiment, the ribbon 110 is made from kale. In embodiments including the colored sheet 108 and/or the ribbon 110, the support pins 112 additionally serve to hold the colored sheet 108 and the ribbon 110 in place. A decorative thread 109 to accommodate a tag 111 for displaying text 113, such as, for addressing the recipient of the bouquet 100 may also be included.

Figure 3:
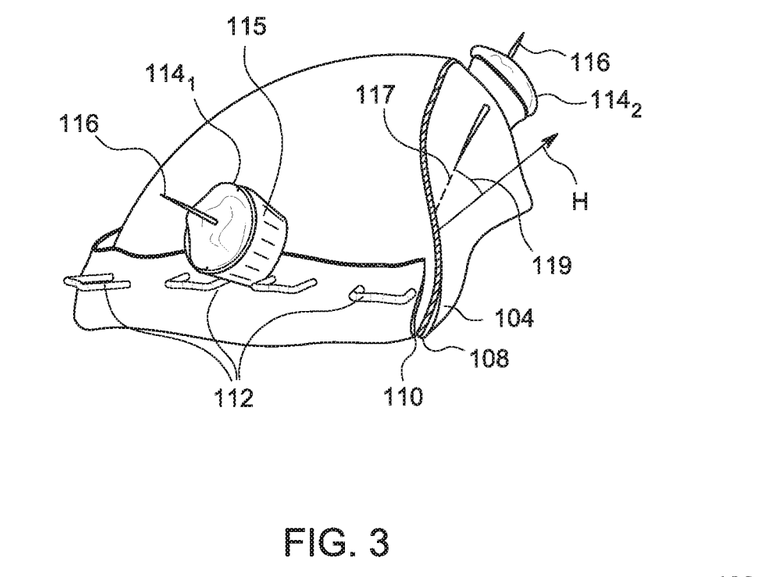
FIG. 3 is a partial cut away view of the cupcake mount shown in FIG. 2, according to one or more embodiments of the present invention.

FIG. 3 is a partial cut away view of a mount 104 shown in FIG. 2 illustrating the mounting of cupcakes $114_1$, $114_2$, and so on, collectively referred to as cupcakes 114, according to one or more embodiments. Portions of support pins 112 project outwards from the mount 104, and according to some embodiments, portions projecting from adjacent support pins 112 forms a base to hold the cupcakes 114. The projection length of the support pins 112 is approximately equal to the portion of the cupcakes covered with cupcake baking cups 115. Skewers 116 are inserted through the center of cupcakes 114 and into the mount 104. The skewers 116 prevent a movement of the cupcakes 114 along the surface of the mount 104. Although shown projecting outside the cupcakes 114 in FIG. 3, the skewers 116 are inserted into the cupcakes 114 (or icing thereon) such that the skewers 114 are not visible. The skewers may be inserted into the cupcakes using any push tool, such as a cup bur used in the jewelry industry. In some embodiments, two or more skewers 116 are inserted into the cupcakes 114 and pushed closer to each other in configuration that 'squeezes' the baking material of the cupcakes 114, thereby resulting in a tighter adherence of the cupcakes 114 to the mount 104. The cupcakes 114 are mounted such that the cupcakes 114 project slightly upwards from the horizontal plane parallel to the base of vase 102. For example, an axis 117 of the cupcake $114_2$ is at a small angle 119 with the horizontal axis H. This slight upward projection of the cupcake $114_2$ prevents an automatic movement of the cupcake $114_2$ away from the mount 104, for example, due to gravity.

The combination of the support pins 112, the skewers 116 and a slight upward tilt of the cupcakes 114 provide a stable support arrangement to hold the cupcakes onto the mount 104, so the cupcakes 114 are not easily dislodged from their position unless intentionally removed, for example, by a consumer of the cupcakes. The support arrangement described above maintains the cupcakes in position during transportation, without incurring any damage to the cupcakes. FIGS. 2 and 3 illustrate the use of support pins 112 to form a base to support the cupcakes 114, and FIG. 4 illustrates an alternative embodiment to form a base to support the cupcakes 114, as further described.

Figure 4:
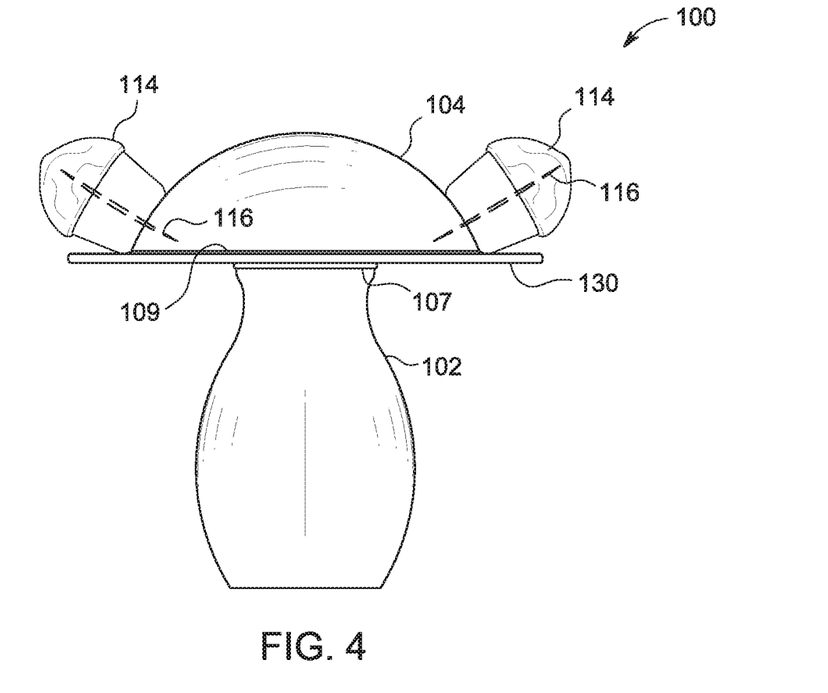
FIG. 4 is a frontal view of a cupcake bouquet of FIG. 1 illustrating an alternate embodiment for mounting cupcakes of the present invention.

FIG. 4 is another frontal view of a cupcake bouquet 100 of FIG. 1 illustrating an alternate embodiment for mounting cupcakes. Instead of using support pins 112 to support a first level of cupcakes, the embodiment illustrated in FIG. 4 uses a supporting disc 130. The supporting disc 130 is attached to the vase 102 with an adhesive 107, and the mount 104 is attached to the supporting disc 130 using the adhesive 109. The supporting disc 130 is made from material used for making carton boxes, for example, which is easily available due to the availability of carton boxes for packaging the bouquet 100. According to some embodiments, the supporting disc 130 is made from other materials, including but not limited to, paper, glass, plastics, metal or a combination thereof. The adhesives 107 and 109 may be similar to or different from the adhesive 106 described above, and include suitable adhesives generally known in the art. The cupcakes 114 are secured to the mount 104 by use of skewers 116, in a manner similar to that described with respect to the embodiment of FIG. 3. The supporting disc 130 provides the vertical support provided by the support pins 112 in the embodiment of FIG. 3. The supporting disc 130 provides vertical support to a first level of cupcakes, while other levels of cupcakes are supported by the first level of cupcakes in combination with further use of support pins and skewers, according to some embodiments.

Figure 5:
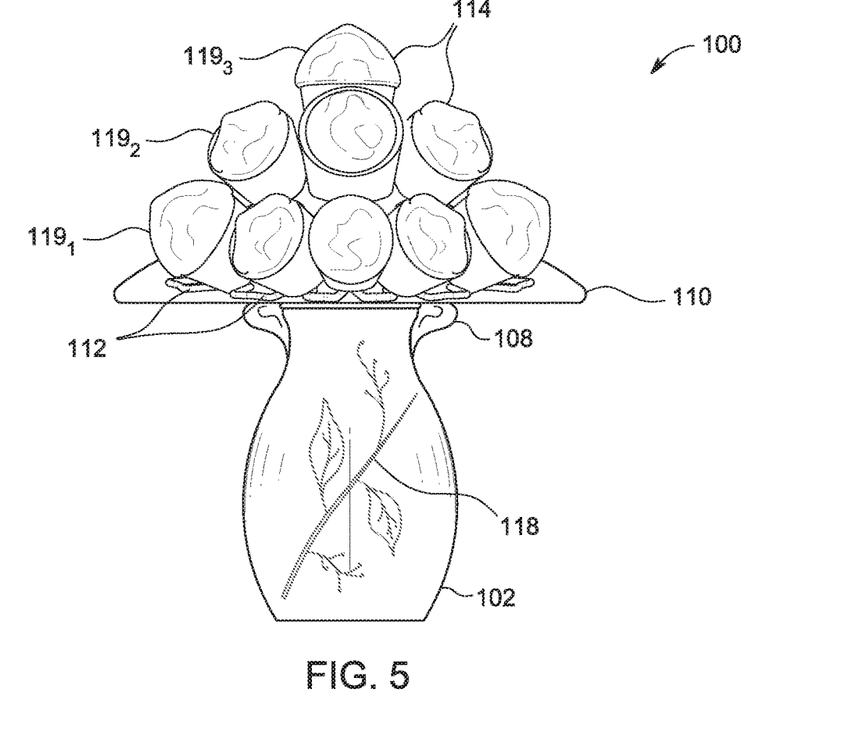
FIG. 5 is a frontal view of an assembled cupcake bouquet, according to one or more embodiments of the present invention.

FIG. 5 is a front view of an assembled cupcake bouquet 100, according to one or more embodiments. According to some embodiments, about 16 support pins 112 are installed to support eight cupcakes 114 in a first level $119_1$ of cupcakes 114 arranged around the mount 104. A second level $119_2$ of cupcakes 114, for example, four cupcakes 114 can be mounted over the first level $119_1$. According to some embodiments, the cupcakes 114 of the first level $119_1$ provide vertical support to the cupcakes 114 of the second level $119_2$, without requiring support pins 112 to support the cupcakes 114 of the second level $119_2$, however, the skewers 116 are provided for each cupcake. The second level $119_2$ supports a third level $119_3$ of one or more cupcakes 114 in a similar manner. According to some embodiments however, support pins 112 are provided for each cupcake 114. While FIG. 5 illustrates the assembled cupcake bouquet 100 made by completing the embodiment illustrated in FIG. 3, an assembled cupcake bouquet can be made similarly by completing the embodiment illustrated in FIG. 4.

According to some embodiments, decorative elements 118 are included in the vase 102. Such decorative elements 118 may be included in the vase 102 before attaching the mount 104 to the vase 102 as shown in FIG. 1, or before attaching the supporting disc 130 to the vase 102. The decorative elements 118 serve to increase the aesthetic of the bouquet 100.

Figure 6:
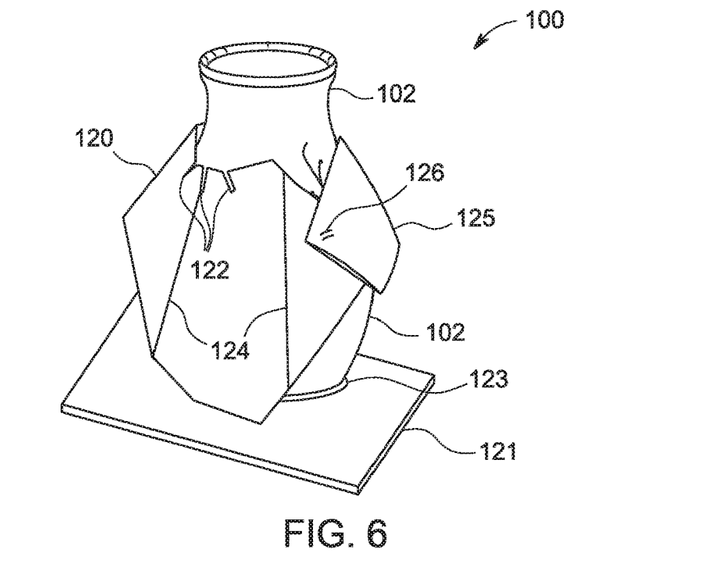
FIG. 6 is a perspective view of a cupcake bouquet of FIG. 1 enclosed in a packaging box prior to being assembled, according to one or more embodiments of the present invention.

FIG. 6 is a perspective view of a cupcake bouquet 100 of FIG. 1 enclosed in a packaging box prior to being assembled, according to one or more embodiments. While the bouquet 100 may be packaged after assembly, that is, the bouquet 100 of FIG. 5 may be packaged, as show in FIG. 6, securing the vase 102 within packaging material such as a carton box 120 before assembling the bouquet 100 protects the vase 102 from damage during the assembling process, for example, as illustrated in FIGS. 1-5. The box 120 is generally made from paperboard, corrugated paper or corrugated fiberboard, however, other suitable materials may also be used without deviating from the scope and spirit of the present invention. FIG. 6 illustrates the box 120 partially, and a portion of the base 121 of the box 120, and a portion of the wraparound portion 125 of the box are shown. The wraparound portion 125 includes cuts 122 and folds 124 to wrap around the box material around the neck of the vase 102. The wrapped around box material is attached together by staples 126, enclosing the vase 102.

The vase 102 of the bouquet 100 is affixed to the base 121 using an adhesive 123, which is a suitable adhesive similar to or different from the adhesive 106. Affixing the vase 102 to the base 121 of the box 120 assists in preventing movement of the bouquet 100 within the box 120, avoiding damage to the cupcakes mounted on the bouquet 100 during transport.

Figure 7:
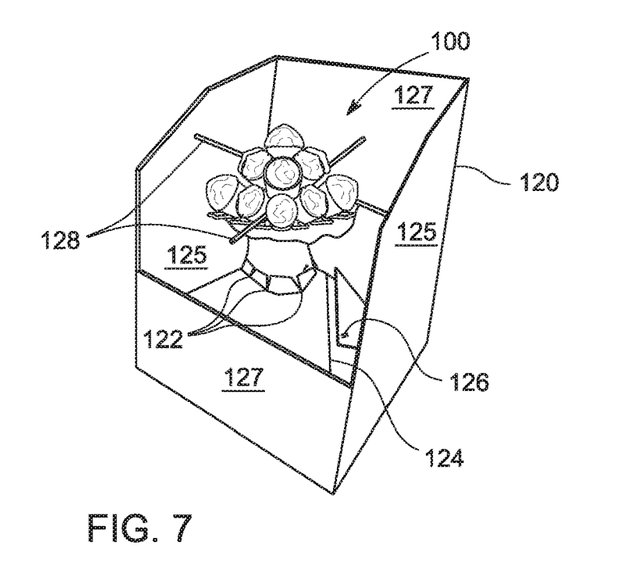
FIG. 7 is a perspective view of the assembled cupcake bouquet of FIG. 5 secured in the packaging box of FIG. 6, according to one or more embodiments of the present invention.

FIG. 7 is a perspective view of the assembled cupcake bouquet 100 of FIG. 5 installed in the packaging box 120 of FIG. 6, according to one or more embodiments. The bouquet 100 further includes two box pins 128 to assist in preventing movement of the bouquet 100 within the box 120. The box pins 128 are made of plastic, or any other suitable material that is lightweight yet rigid to sustain the movement of the bouquet 100 while being transported. The two box pins 128 are skewered through the mount 104 of the bouquet 100, such that each of the box pins touches or nearly touches opposing walls of the box 120. For example, one box pin $128_1$ skewered through the mount 104 of the bouquet 100 has a length approximately equal to the distance between sidewalls 125 of the box 120. The other box pin $128_2$ has a length equal to the distance between a back wall 127 and a front wall 127 of the box 120. When a lid (shown in FIG. 9) is mounted over the box 120, movement of the box pins 128 will be constrained by the sidewalls 125 and the back wall 127 and a wall of the lid interfacing with the front wall 127, thereby preventing the motion of the bouquet 100 within the box 120, for example, when the bouquet 100 packaged in the box 120 is transported.

As illustrated by FIGS. 6 and 7, attaching the vase 102 to the base 121 of the box, and the use of box pins 128 prevent the movement of an assembled bouquet 100 within the box.

Figure 8:
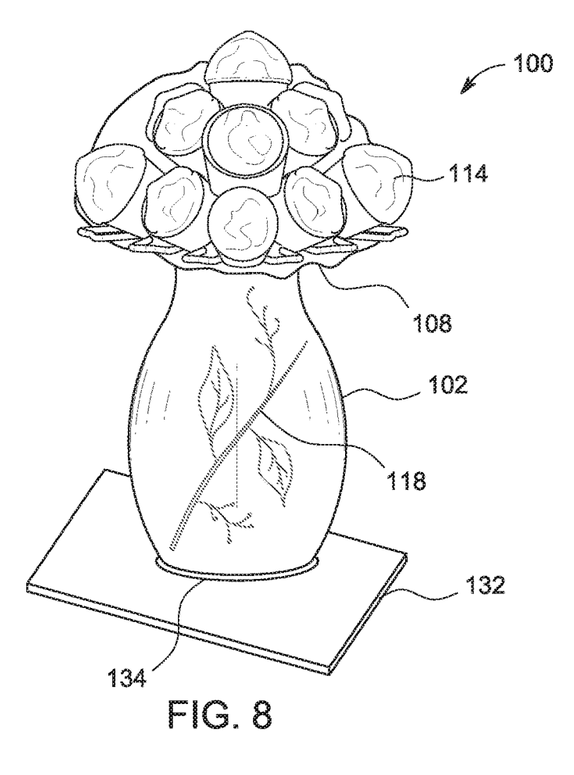
FIG. 8 is a perspective view of an assembled cupcake bouquet fixed to a base plate, according to one or more embodiments of the present invention.

FIG. 8 illustrates an alternate technique to prevent the movement of an assembled bouquet 100 within the box, as further described.

FIG. 8 is a perspective view of an assembled cupcake bouquet 100 fixed to a base plate 132, according to one or more embodiments. The vase 102 of the bouquet 100 is affixed to the base plate 132 by an adhesive 134, similar to or different from the adhesive 106, as generally known in the art. The base plate 132 has dimensions approximately equal to a base of a box in which the bouquet 100 is packaged, for example the base 121 of the box 120. Due to the same size of the base plate 132 and the base 121 of the box 120, the movement of the base plate 132, and therefore the movement of the bouquet 100 attached thereon, is constrained. Such an arrangement therefore prevents the movement of the bouquet within the box 120, and avoids damage to the bouquet 100, for example, during transportation. According to alternative embodiments, the vase 102 is filled with heave materials such as pebbles to provide stability to the bouquet 100 to stay upright by balancing the top-heavy bouquet 100 due to the weight of the cupcakes 114.

Figure 9:
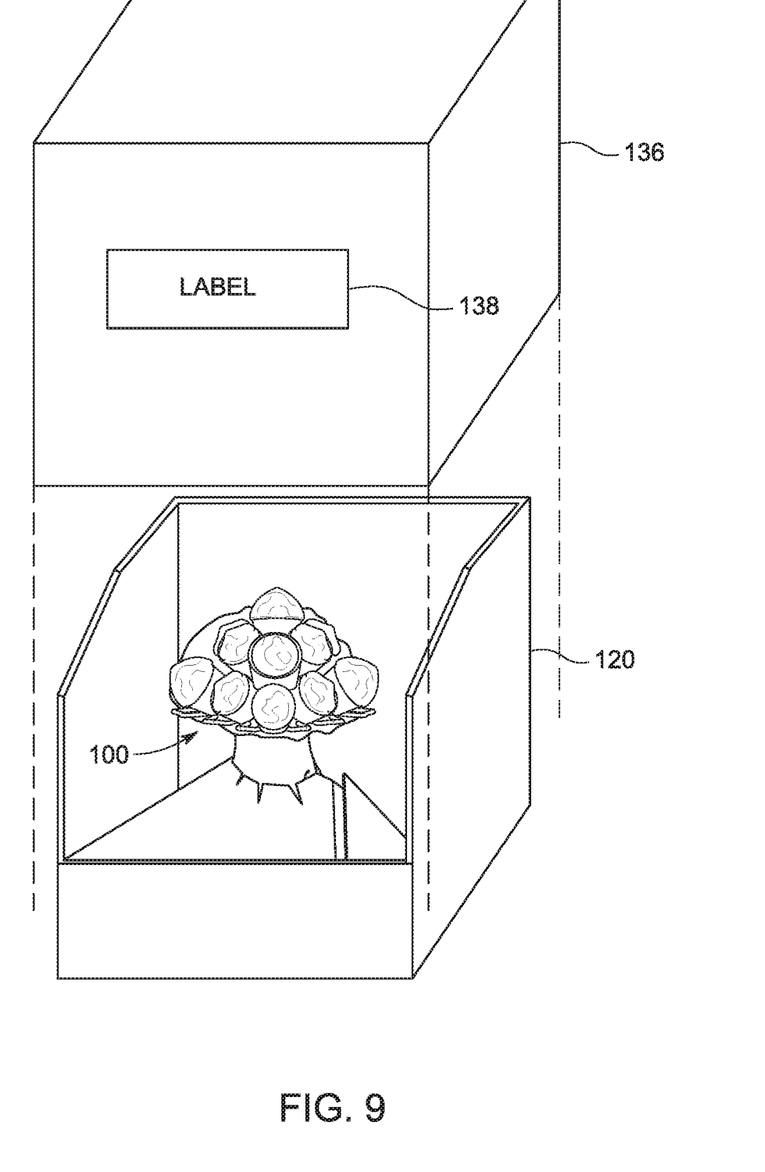
FIG. 9 is a perspective view of the completed cupcake bouquet of FIG. 7 with complete packaging, according to one or more embodiments of the present invention.

FIG. 9 is a perspective view of the completed cupcake bouquet 100 of FIG. 7 with complete packaging, according to one or more embodiments. The box 120 with the bouquet 100 installed therein is enclosed by a lid 136. The lid 136 is made from a material similar to the material of the box 120, and may include a label 136 for advertisement and/or addressing purposes. Additionally, the box 120 has two notched front corners which allow the lid 136 to easily pass over the box 120, saving time and hassle.

Cupcake bouquets are assembled using the techniques illustrated with respect to FIGS. 2 and 3, or alternatively FIG. 4, such that the cupcakes are stably mounted on the bouquet. Thereafter, the assembled bouquets are packaged, for example, installed in carton boxes using the techniques illustrated with respect to FIGS. 6 and 7, or alternatively FIG. 8, such that the movement of the bouquets in the boxes is restricted. Various techniques described herein therefore provide a cupcake bouquet or cupcake holder having a stable mounting mechanism for the cupcakes, and a stable packaging arrangement, which prevent any damage to the cupcakes or the cupcake bouquet during transportation and handling.

Various elements are described above in association with their respective functions. These elements are considered means for performing their respective functions as described herein. While the foregoing is directed to embodiments of the present invention, other and further embodiments of the invention may be devised without departing from the basic scope thereof.

The invention claimed is:

1. A method for assembling a cupcake bouquet, the method comprising:

attaching a mount to a vase;

attaching a base to the vase;

inserting a plurality of support pins into the mount to provide support as a base for a plurality of cupcakes;

placing the plurality of cupcakes on the plurality of support pins;

inserting a skewer into the center of each of the plurality of cupcakes and into the mount to secure each cupcakes in place;

inserting two or more box pins into the mount so that ends of the two or more box pins come into contact of a box for transporting the cupcake bouquet; and placing the cupcake bouquet into the box.

\* \* \* \* \*